(12) United States Patent
Olsson et al.

(10) Patent No.: US 8,695,374 B2
(45) Date of Patent: Apr. 15, 2014

(54) CHEMICAL HEAT PUMP WORKING WITH A HYBRID SUBSTANCE

(75) Inventors: Ray Olsson, Hammarland (FI); Göran Bolin, Täby (SE)

(73) Assignee: Climatewell AB (Publ), Hagersten (SE)

( * ) Notice: Subject to any disclaimer, the term of this patent is extended or adjusted under 35 U.S.C. 154(b) by 800 days.

(21) Appl. No.: 12/302,868

(22) PCT Filed: May 29, 2007

(86) PCT No.: PCT/SE2007/000522
§ 371 (c)(1),
(2), (4) Date: Feb. 4, 2009

(87) PCT Pub. No.: WO2007/139476
PCT Pub. Date: Dec. 6, 2007

(65) Prior Publication Data
US 2009/0249825 A1    Oct. 8, 2009

(30) Foreign Application Priority Data

May 29, 2006   (SE) ...................................... 0601222

(51) Int. Cl.
| | |
|---|---|
| F25B 15/00 | (2006.01) |
| F24F 3/14 | (2006.01) |
| B01D 59/26 | (2006.01) |
| B01J 19/00 | (2006.01) |
| B01J 8/02 | (2006.01) |
| B01J 23/90 | (2006.01) |

(52) U.S. Cl.
USPC .................. 62/476; 96/143; 96/144; 96/145; 96/146; 165/60; 422/198; 422/211; 422/223

(58) Field of Classification Search
USPC ............... 165/60; 62/476; 422/198, 211, 223; 96/143–146
See application file for complete search history.

(56) References Cited

U.S. PATENT DOCUMENTS

| | | | | |
|---|---|---|---|---|
| 4,186,794 A | * | 2/1980 | Brunberg et al. | ................ 62/101 |
| 4,336,004 A | * | 6/1982 | Grabb | ........................... 417/283 |

(Continued)

FOREIGN PATENT DOCUMENTS

| | | |
|---|---|---|
| CN | 1173831 A | 2/1998 |
| CN | 1334911 A | 2/2002 |

(Continued)

*Primary Examiner* — Alexandra Elve
*Assistant Examiner* — Henry Crenshaw
(74) *Attorney, Agent, or Firm* — Birch, Stewart, Kolasch & Birch, LLP

(57) ABSTRACT

A chemical heat pump includes a reactor part (1) that contains an active substance and an evaporator/condenser part (3) that contains that portion of volatile liquid that exists in a condensed state and can be absorbed by the active substance. A channel (4) interconnects the reactor part and the evaporator/condenser part, In at least the reactor part a matrix (13) is provided for the active substance so that the active substance both in its solid state and its liquid state or its solution phase is held or carried by or bonded to the matrix. The matrix is advantageously an inert material such as aluminum oxide and has pores, which are permeable for the volatile liquid and in which the active substance is located. In particular, a material can be used that has a surface or surfaces, at which the active substance can be bonded in the liquid state thereof. For example, the matrix can be a material comprising separate particles such as a powder or a compressed fiber material.

22 Claims, 9 Drawing Sheets

(56) References Cited

U.S. PATENT DOCUMENTS

| | | | | |
|---|---|---|---|---|
| 4,372,371 | A * | 2/1983 | Baker | 165/9 |
| 4,949,549 | A | 8/1990 | Steidl et al. | |
| 5,435,155 | A * | 7/1995 | Paradis | 62/515 |
| 5,897,845 | A * | 4/1999 | Denny et al. | 423/210 |
| 6,074,972 | A | 6/2000 | Bratton et al. | |
| 6,634,183 | B1 * | 10/2003 | Jonsson et al. | 62/476 |
| 6,865,906 | B1 | 3/2005 | Sabin | |
| 2002/0017380 | A1 * | 2/2002 | Jonsson et al. | 165/104.12 |
| 2002/0166335 | A1 * | 11/2002 | Smith et al. | 62/480 |
| 2003/0181115 | A1 * | 9/2003 | Nagasuna et al. | 442/149 |
| 2006/0078487 | A1 * | 4/2006 | Endo et al. | 423/324 |
| 2006/0101943 | A1 * | 5/2006 | Snow et al. | 75/252 |
| 2009/0249825 | A1 * | 10/2009 | Olsson et al. | 62/476 |
| 2010/0205981 | A1 * | 8/2010 | Bolin et al. | 62/56 |
| 2011/0056234 | A1 * | 3/2011 | Bolin et al. | 62/476 |

FOREIGN PATENT DOCUMENTS

| | | | | |
|---|---|---|---|---|
| DE | 196 30 073 A1 | | 1/1998 | |
| JP | 9-75719 A | | 3/1997 | |
| JP | 2000-241041 A | | 9/2000 | |
| JP | 2002-533648 A | | 10/2002 | |
| JP | 2002-543360 A | | 12/2002 | |
| JP | 2005-127683 A | | 5/2005 | |
| JP | 2007-513319 A | | 5/2007 | |
| SU | 147799 | * | 3/1986 | F25B 17/00 |
| SU | 1477999 | * | 5/1989 | F25B 17/00 |
| SU | 1477999 A1 | | 5/1989 | |
| WO | WO 96/24435 A1 | | 8/1996 | |
| WO | WO-00/37864 A1 | | 6/2000 | |
| WO | WO 00/37864 A1 | | 6/2000 | |
| WO | WO 0050827 A1 | | 8/2000 | |
| WO | WO 2005/054757 A1 | | 6/2005 | |

* cited by examiner

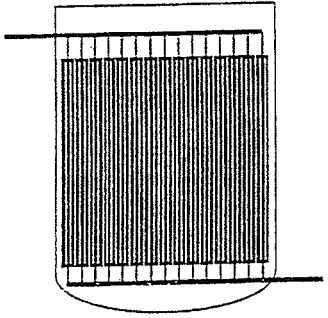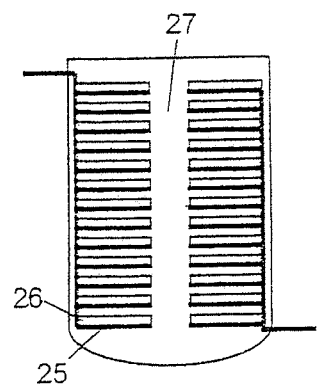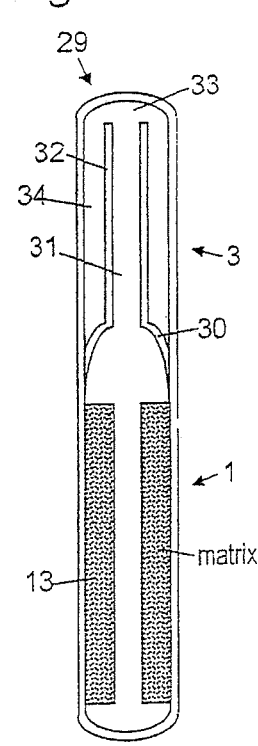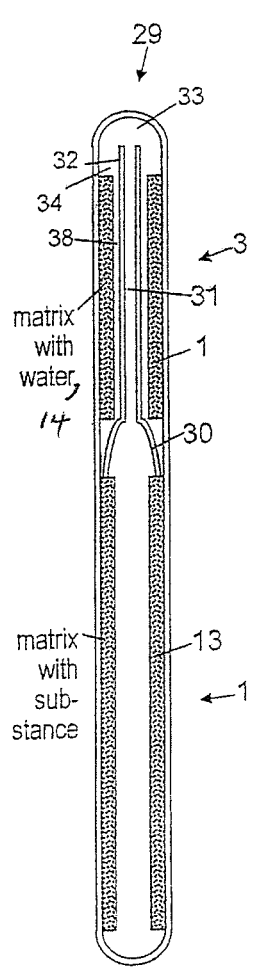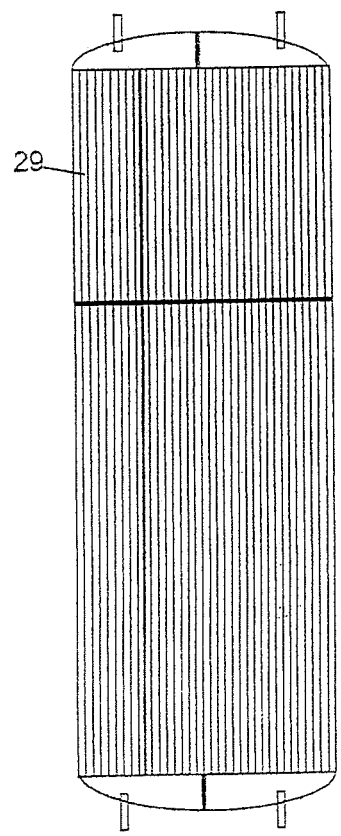

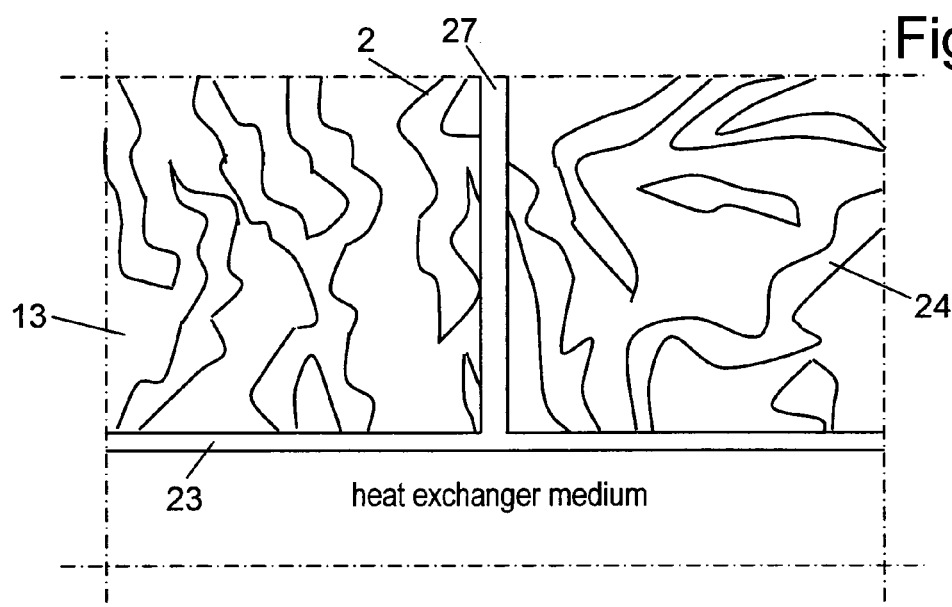

CHEMICAL HEAT PUMP WORKING WITH A HYBRID SUBSTANCE

RELATED APPLICATION

This application claims priority and benefit from Swedish patent application No. 0601222-3, filed May 29, 2006, the entire teachings of which are incorporated herein by reference.

TECHNICAL FIELD

The present invention relates to a chemical heat pump working according to the hybrid principle.

BACKGROUND OF THE INVENTION

The principle of the function of the chemical heat pump is well known, see for example U.S. Pat. Nos. 5,440,989, 5,056,591, 4,993,239, 4,754,805 and the published International Patent Applications WO 94/21973, WO 00/31206, WO 00/37864 and WO 2005/054757. In a chemical heat pump an active substance is provided that performs the very process of the heat pump and that works together with a volatile medium, the absorbent, which usually is a dipolar liquid, in most cases water. As the working active substance can, according to the prior art, either a solid substance, a liquid substance or a "hybrid substance" be used. By "solid" active substance is meant that the substance all the time, during the whole process and all cycles remains in a solid state, i.e. both with and without a volatile medium absorbed therein. By a "liquid" active substance is meant that the substance all the time, during the whole process and all cycles, remains in a liquid state, i.e. both with and without a volatile medium absorbed therein. By a "hybrid" substance is meant that the active substance during the process in the heat pump is alternating between a solid state and a liquid state.

For a solid active substance, advantages are obtained that include that the cooling temperature in the system in which the heat pump is incorporated remains constant during the whole discharging process and that a relatively large storage capacity can be obtained. A typical value of the storing capacity for a solid substance using water as the absorbent, taken as cooling energy, is about 0.3 kWh/1 of substance. Another advantage associated with the use of a solid substance is that no moving components are required in the system. Heat is supplied to or drawn from the substance through a lamellar heat exchanger or a plate heat exchanger that is in a homogeneous contact with the substance. Hence, in the chemical heat pump described in the cited patent application WO 00/31206 no moving components are provided on the process side. The disadvantage associated with a solid substance is the limited power that can be obtained due to the generally low heat conductivity of solid substances. In the same patent application, among other things, a method is described for solving the problem associated with the bad heat conductivity of solid substances and the low power/efficiency resulting therefrom. The method includes that the solid substance is silted up in the sorbate to form a slurry having such a consistency that it can be easily filled around or into a heat exchange. The amount of sorbate in the slurry should exceed the concentration of sorbate that will later exist in the discharged state of the heat pump. Thereafter, when the substance is charged it obtains a final sintered shape, a so called matrix, which is not dissolved in the normal absorption of sorbate in the operation of the heat pump.

For the use of a liquid substance the advantage of a high power is obtained since the substance can be sprayed over the heat exchanger in both the charging and the discharging processes and hence be efficiently cooled and heated, respectively. The disadvantage associated with a solid substance is that the cooling capacity decreases as a function of the dilution of the absorbent. Actually, it limits strongly the operating interval within which the substance can be used, this in turn reducing the storage capacity, taken as above as cooling energy per liter substance. Most of the liquid substances for use in chemical heat pumps are solutions of strongly hygroscopic inorganic salts in preferably water and similarly water is used as the absorbent. This gives another limitation due the fact that the dissolved substance cannot be allowed to crystallize. Crystallization creates problems in spray nozzles and pumps.

By using a so called hybrid substance several of the advantages associated with solid and liquid systems can be combined, see the International Patent Application WO 00/37864 cited above. The chemical heat pump disclosed in this patent application operates according to a special procedure that can be called the hybrid principle, the hybrid method or the hybrid process. In that process, the substance exists both in a solid and a liquid state during the process, the solid phase being used for storing energy, with as large an energy density as in solid systems whereas the heat exchange to and from the substance is only made in the liquid phase of the substance with as large an efficiency as in common liquid systems. Only the liquid phase is used for heat exchange to the surroundings. A condition thereof is that the solid and liquid phases can be kept separated during the process. A separation can be obtained by filtering using a separating means of a suitable kind, such as a net or a filter or in some other way. The liquid phase, often called the "solution", is pumped and sprayed over a heat exchanger. As in the case of systems using only a solution, i.e. with a substance that all time is liquid, it is important that the pumps, valves and spray nozzles of hybrid systems are not blocked by crystals in the circulation path.

Thus generally, the solid system has in this regard an apparent advantage, since it does not require any pumps, valves and spray nozzles.

In FIG. 1 a chemical heat pump is generally shown in a schematic way, the heat pump designed for producing cooling or heat and working according to the hybrid process described in the cited International Patent Application WO 00/37864. The heat pump includes a first container 1 or accumulator including a more or less dissolved substance 2 that can exothermically absorb or endothermically desorb a sorbate. The first container 1 is connected to a second container 3, also called condenser/evaporator, through a pipe 4. The second container 3 works as a condenser for condensing gaseous sorbate 6 to form liquid sorbate 5 during endothermic desorption of the substance 2 in the first container 1 and as an evaporator of liquid sorbate 5 to form gaseous sorbate 6 during exothermal absorption of the sorbate in the substance 2 in the first container 1. The substance 2 in the accumulator 1 is in heat conducting contact with a first heat exchanger 7 located therein which can in turn through a liquid flow 8 be supplied with heat from or deliver heat to the surroundings. The liquid 5 in the evaporator/condenser part 3 is similarly in a heat conducting contact with a second heat exchanger 9 located therein to or from which heat can be supplied or delivered from or to the surroundings, respectively, through a heat flow 10. In order that the heat pump will work according to the hybrid principle the first heat exchanger 7 together with the substance 2 in the solid state thereof is enclosed in a fine-meshed net or filter 11. Solution that is the liquid state of the substance exists in the lower portion of the accumulator 1 and is there collected in a free space 12 located beneath the first heat exchanger 7. From this space 12, solution can through a conduit 12c and a pump 12d be sprayed over the first heat exchanger 7.

To sum up, the following is true:

In a system working with a solid substance a constant cooling temperature is obtained since the reaction occurs between two phase states of the substance. Both of these two phase states are solid and maintain, in a transformation from one of the states to the other state, a constant reaction pressure of the absorbent. The reaction pressure remains constant until all of the substance has been transformed from the first state to the second state. The disadvantage of the system is the very low heat conductivity and the low power resulting therefrom. Its advantages include that it works without any moving parts, has a high storage capacity and a constant reaction pressure.

In a system working with a hybrid substance the first phase is, when the absorbent is absorbed by the substance, i.e. in the discharge process, solid whereas the second phase is liquid and then in the same way as above, a constant reaction pressure of the absorbent is maintained. The substance will then successively continuously change from a solid to a liquid state at the same time as a constant cooling temperature is obtained. The process continues with a constant reaction pressure until all of the substance has changed from its solid to its liquid state. In the same way the reaction pressure is constant in the charging process when the substance changes from a liquid to a solid state. The storage capacity and the reaction pressure are equivalent to those for a solid substance. The method used in systems working with a hybrid substance in order to obtain a high power is to work with solutions in the same way as in a system working with a liquid substance. Liquid is pumped from the substance container through a system for separating crystals to a spraying system by which the solution is sprinkled over the heat exchanger that forms a separate unit in the reactor.

SUMMARY

It is an object of the invention to provide an efficient chemical heat pump working according to the hybrid principle.

It is another object of the invention to provide a chemical heat pump in which advantages of a solid system are combined with advantages of a hybrid system.

As has been mentioned above, chemical heat pumps working with a solid substance has the disadvantage associated with a very low heat conductivity and hence a low power or efficiency and the advantages of having the ability of working without any moving parts, a high storage capacity and a constant reaction pressure. Chemical heat pumps working with a hybrid substance has the advantages of a high power or efficiency due to the higher heat conductivity and additionally, the fact that they can also work without any moving parts and that they have a high storage capacity and a constant reaction pressure.

In a chemical heat pump working with a hybrid substance, if the solution of the active substance is used to increase the heat conduction between the active substance and the heat exchanger in the accumulator, which can for example be achieved by the fact that the active substance is not submitted to any displacement during the total process in the chemical heat pump, i.e. so that the active substance all the time is stationary or located in a stationary way, a chemical heat pump having a so called "solid" hybrid substance can be obtained. To achieve it, the solution of the active substance can be sucked into and/or be bonded in a passive substance, here called a matrix or a carrier, that generally should be in a good heat conducting contact with the heat exchanger in the accumulator and can be arranged as of one or more bodies which in turn can be closely integrated with each other. That the substance is passive means that it does not cooperate in the absorption and releasing of the volatile medium by the active substance. Thus, the function of the matrix is to maintain the solution of the active substance at the location thereof and thereby increase the heat conduction between the heat exchanger and the active substance when the active substance is changing from its liquid to its solid state in the charging process and from its solid to its liquid state during the discharging process. Thereby the fact that the solution often has a higher heat conducting capability than the solid substance can be exploited. The matrix is formed from a substance that is inert to the process in the heat pump and may generally have an ability of binding the solution phase of the active substance to itself and in same time allow the active substance to interact with the volatile medium. In particular, it may be desirable that the body or the bodies from which the matrix is formed should be efficiently capable of absorbing and/or be capable of binding the solution phase of the active substance in a capillary way. The matrix may include more or less separate particles, such as powders of for example varying granular sizes and comprising grains of varying shapes, fibres having for example varying diameters and varying fibre lengths, and/or a sintered mass having a suitable porosity, that for example does not have to be uniform but can vary within the formed matrix bodies. The size and shape of the particles, i.e. in the special cases grain size, diameter and porosity, and porosity in the case of a solid matrix and the choice of material in the matrix bodies influence in the respective case the storing capacity and power and efficiency of the finished accumulator. In the case where the matrix is applied as a layer to the surface of the heat exchanger, also the thickness of the layer can influence the power or efficiency of the accumulator.

The ability of the matrix to suck liquid into it so that the liquid forms the heat caring medium and the ability thereof of still allowing gas transport through the matrix are equally applicable to the condenser/evaporator unit in a chemical heat pump. When charging the chemical heat pump, gas is being transported through the matrix to be condensed at the surface of the heat exchanger and then be absorbed by the matrix, after which the absorbed liquid increases the heat conduction of the matrix, so that more gas can be cooled, condensed and absorbed. When discharging the chemical heat pump the matrix releases water vapour, this cooling the absorbed volatile liquid that due to the its good heat conductivity transports heat for evaporation from the surface of the heat exchanger through the liquid to the evaporation zone.

Thus, the processes in the heat pump can be said to be performed with the active substance sucked into a body or wick of fibres or powder which has turned out to result in a high power or efficiency. The power or efficiency has little to do with heat conduction in the body or wick but depends on the reaction in the liquid phase, i.e. among other things the fact that the active substance in its finely divided state changes to a solution that conducts heat better than the finely divided solid material.

The matrix that may be said to be a sucking or absorbing material can be chosen among a plurality of different materials. For example, successful tests have been performed using fabrics of silicon dioxide as a matrix and a matrix including sand and glass powders in different fractions. The heat pump works by the fact that heat is conducted in the liquid phase at the same time as the structure of the matrix is sufficiently permeable to allow transport of the vapour phase of the volatile medium. It is also possible to produce the matrix by sintering a powder or fibres to form a more solid structure.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIGS. 7 and 8 are schematics of alternative accumulator tanks for the chemical heat pump shown in FIG. 2a, FIG. 9a is a schematic of a unit pipe or unit cell that has a function similar to that of the chemical heat pump of FIG. 2a but having a different structure and exterior heat exchanger surfaces, FIG. 9b is a schematic similar to FIG. 9b but of a unit pipe having a function similar to that of the chemical heat pump of FIG. 2b, FIG. 10a is a schematic of a chemical heat pump including a plurality of the units of FIG. 9a or 9b, FIG. 11d is a cross sectional detail view of a matrix material located at a heat exchanger surface from which a flange projects.

DETAILED DESCRIPTION

Figure 1:
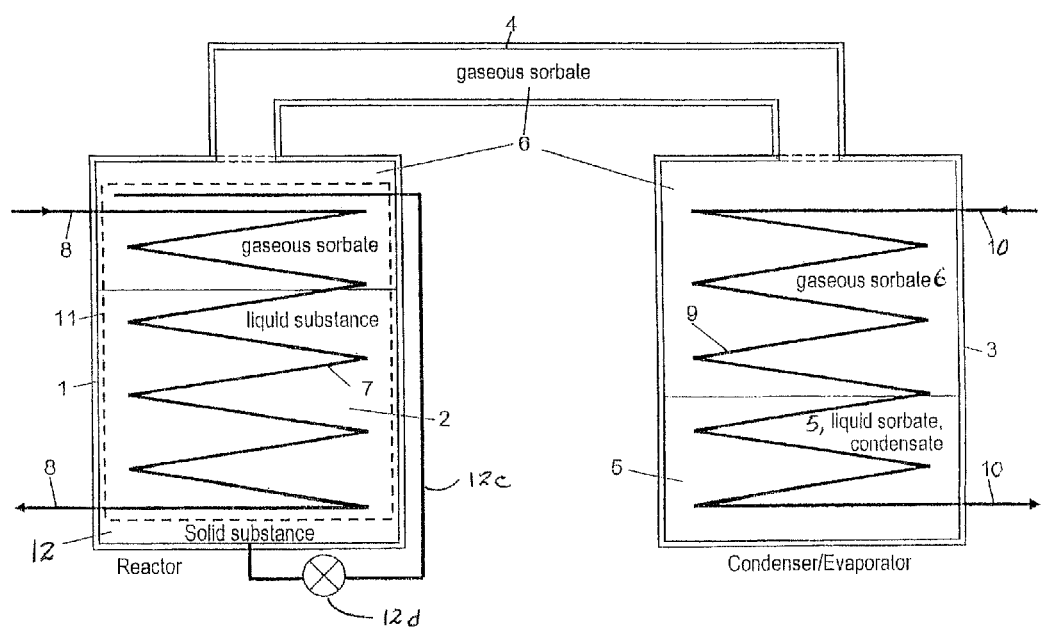
FIG. 1 is a schematic of a chemical heat pump according to prior art working according to the hybrid principle.
Figure 2A:
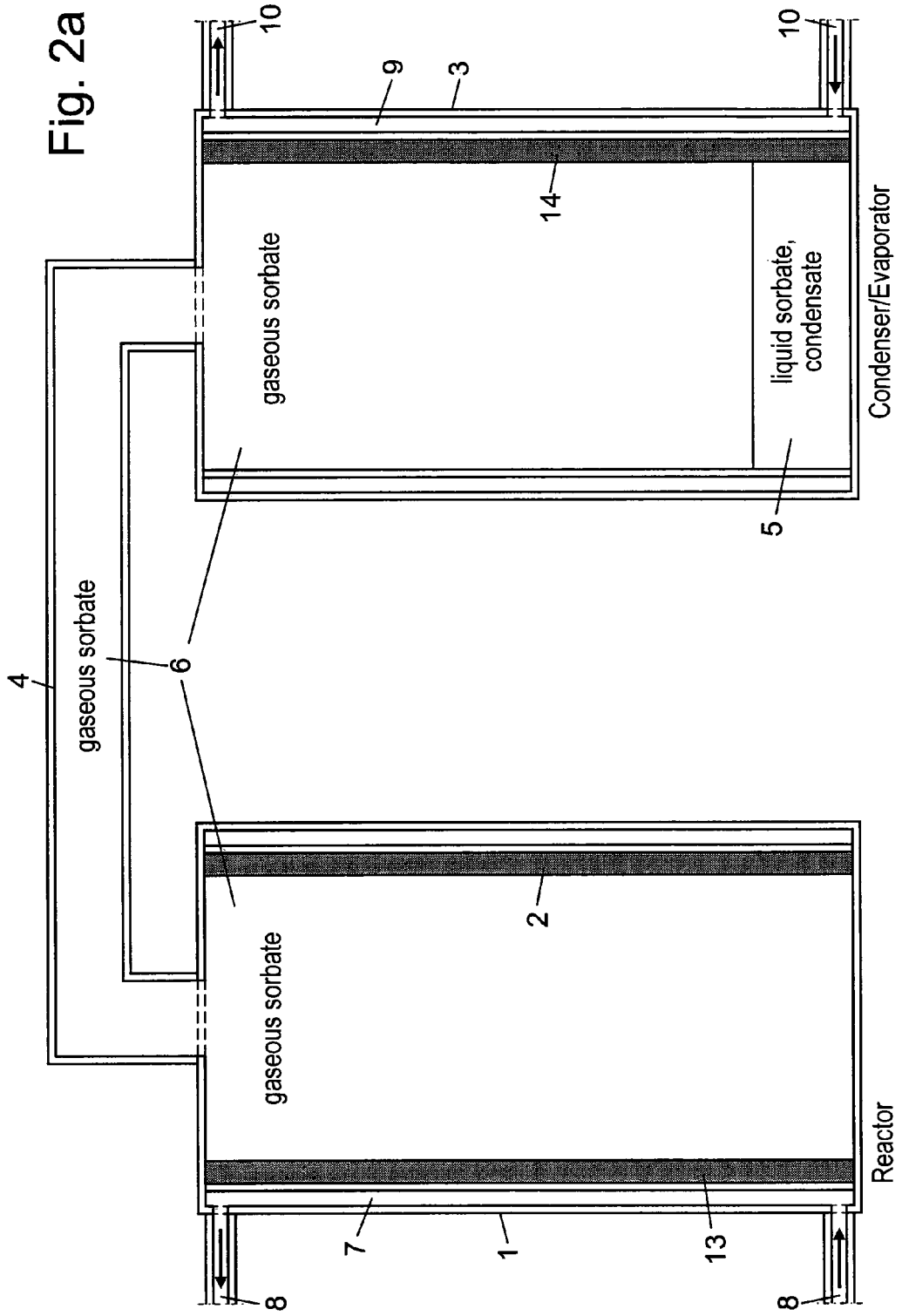
FIG. 2a is a schematic similar to FIG. 1 but of a chemical heat pump in which the active substance 2 is absorbed in a carrier.
Figure 2B:
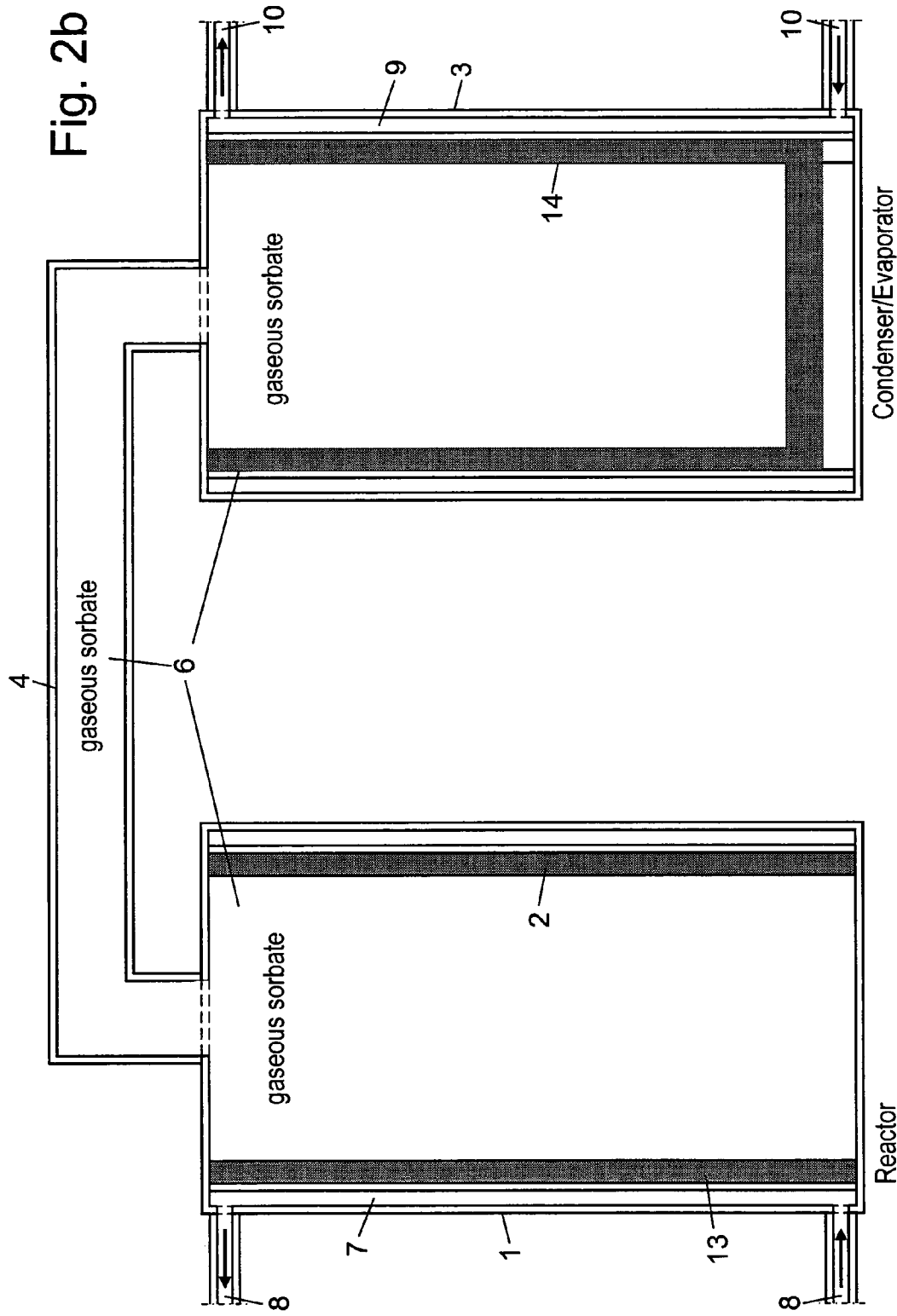
FIG. 2b is a schematic similar to FIG. 2a of an alternative embodiment of a chemical heat pump.

In FIG. 2a a modified chemical heat pump for production of chillness/cooling or heat is schematically shown that uses the hybrid process and a matrix for holding and/or carrying the active substance 2.

The modified chemical heat pump includes in a conventional way a first container 1, also called accumulator or reactor, containing an active substance 2, herein also called only "substance". The substance 2 can exothermically absorb and endothermically desorb a sorbate, also called the absorbent, usually water. The substance 2 is here illustrated to be held by or carried by or sucked into a matrix or carrier 13 that generally forms or is at least one porous body which has open pores and is made from a suitable inert substance. The matrix can in a typical case consist of a finely divided powder of for example aluminium oxide, applied in a layer having a suitable thickness, for example a relatively thin layer such as a layer having a thickness of 5-10 mm. In this embodiment the matrix in the first container 1 is applied only at the interior surfaces of this container that are located at a first heat exchanger 7, as shown particularly only at the vertical interior surfaces of the first container. The first container 1 is connected to another container 3, also called condenser/evaporator, through a fixed or stationary gas connection 4 having the shape of a pipe that at its ends is connected to the top sides of the containers 1, 3. The second container works as a condenser for condensing gaseous sorbate 6 to form liquid sorbate 5 in an endothermic desorption of the active substance 2 in the first container 1 and as an evaporator of liquid sorbate 5 to form gaseous sorbate 6 in an exothermic absorption of sorbate in the active substance in the first container. The second container 3 is here illustrated to have half the portion of its interior surface, which is in contact with a second heat exchanger 9, covered with a material 14 that is sucking in a capillary way and half the same interior surface is free. In the embodiment according to the figure it means that half the inner vertical surface of the second container 3 is covered with a material having a capillary sucking function whereas the rest of the interior surface thereof is free. Condensation of gaseous sorbate 6 occurs at the free surface of the heat exchanger 9 in the second container 3, and evaporation occurs from the material 14 that is capillary sucking on the interior surface of the second container 3.

The various components of the chemical heat pump, also called the system, i.e. the interior spaces in the first and second containers 1, 3 and the gas conduit 4 that are in fluid connection with each other, are entirely gas tight and evacuated from all other gases than the gas 6 participating in the chemical process, also called the volatile medium or absorbent, that usually is water vapour. The active substance 2 in the accumulator 1 is in a direct heat conducting contact with surfaces of the first heat exchanger 7 that in this embodiment is located at the vertical interior surfaces enclosing the accumulator 1, and that thus also can be said to enclose the accumulator, and that can be supplied with heat from or deliver heat to the surroundings through a first liquid flow 8. The liquid 5 in the evaporator/condenser part 3 is in a similar way in a direct heat conducting contact with surfaces of the second heat exchanger 9 that in this embodiment is placed at the vertical interior surfaces of the evaporator/condenser part and hence also can be said to enclose the evaporator/condenser part and to and from which heat can be supplied or transported from or to the surroundings, respectively, through a second liquid flow 11.

The active substance 2 in the chemical heat pump is selected so that it at the temperatures for which the heat pump is intended can operate so that it changes between a solid and a liquid state in the discharging and charging processes of the heat pump. Thus, the reaction in the accumulator 1 occurs between two phases, a solid phase state and a liquid phase state, of the active substance 2. In the discharging process when the absorbent is absorbed by the active substance 2 the first phase is solid whereas the second phase is liquid and then a constant reaction pressure is maintained for the absorbent. The active substance 2 will then successively change from a solid to a liquid state at the same time as a constant cooling temperature is obtained. The process continues with a constant reaction pressure until substantially all of the active substance 2 has changed from its solid to its liquid state. In a corresponding way the reaction pressure in the charging process is constant while the active substance 2 is changing from its liquid to its solid state.

A normal hybrid substance, see the patent application WO 00/37864 mentioned above, can advantageously be used that is diluted to a desired concentration in the solution of the sorbate and thereafter is sucked into a matrix 13 consisting of an inert powder, i.e. a powder of a material that is not to any substantial extent changed during the operation of the chemical heat pump. Thus, the material should have a solid state during the changing conditions in the heat pump and it should not chemically interact with, i.e. not chemically influence or be affected by, any of the substances or media that change their aggregate states during operation of the heat pump. In tests performed this powder has for example been aluminium oxide and the active substance LiCl. Other possible active substances 2 may be $SrBr_2$, etc., see also the International Patent Application WO 00/37964 mentioned above. The granular size of the powder can here be of importance and also the capability thereof to suck or absorb in a capillary way. To form suitable bodies of the matrix 13 such a powder can first be applied to one or more surfaces of a heat exchanger as a layer having a suitable thickness, for example with a thickness between 5 and 10 mm. In most cases then a net-structure of some kind, not shown, must be applied to the heat exchanger to hold the respective layer in order to form a body from the powder. For example, tests have been performed using layers, having a thickness of 10 mm applied to the outside of pipes, inside pipes and to the bottom of the container. The solution, i.e. the active substance 2 diluted by the volatile medium, also called the sorbate, in its liquid state, is then sucked into the powder in the layers and is allowed to run out of it, until all of the remaining solution is bonded in a capillary way in the powder in the layers. Thereafter, the reactor can be used in the same way as a reactor for a solid substance is used, see e.g. the International Patent Application WO 00/31206 mentioned above.

The matrix 13 together with the active substance 2 held therein is in this case not a solid body but a loose mass similar to wet sand in the discharged state of the heat pump. However, in the charged state of the heat pump, the matrix 13 is hard. The solution of the active substance 2 has a significantly better heat conducting capability than the active substance 2 in the solid state thereof. Heat from the first heat exchanger 7 can then be efficiently transported to or away from the active substance 2. If for example a matrix 13 consisting of aluminium oxide is filled with a 3 molar LiCl solution, a very rapid and efficient charging of the system is performed down to about a 1 molar solution. Thereafter the power decreases since the active substance 2 now does not any longer contain any solution, i.e. does not exist in any part in a liquid phase or a solution phase. However, there is no problem to drive the process down to the concentration of 0 molar. In the discharging process the process works very well up to a state where the solution is 2.7 a 2.8 molar after which it is retarded. This is so because the matrix 13 has not any longer any permeability to gas when the concentration of 3 molar is reached. In this condition the matrix is full, i.e. the matrix 13 has absorbed as much solution as is substantially possible.

The function and power of hybrid systems using a solution sucked into a matrix 13 is typically significantly better than those of solid systems. However, larger heat exchanger surfaces are required than required for systems using hybrid substances and only a free solution. Tests show that a 2 a 3 times larger heat exchanger area is required to reach, in a hybrid system using a "bonded" solution phase, the same power as in a hybrid system using only a free solution. However, then the power density at the surface in such a system having an increased efficient area of the heat exchanger surface is so small that the heat exchanger does not necessarily have to be directly acting but can advantageously be enlarged. The term directly acting heat exchanger, or a directly acting heat exchange between heat exchanger and active substance/solution, means that the active substance/solution exists at the outer surface of a smooth, simple wall of the heat exchanger while the heat carrying/cooling medium or the fluid in the heat exchanger is circulating at the interior surface of the same wall, i.e. the active substance/solution has a substantially direct contact with the heat exchanger medium, through only a relatively thin and flat wall in the heat exchanger. The term heat exchanger or a heat exchange with en enlarged surface means that the active substance/fluid exists at a surface of the heat exchanger that has been given an enlarged effective heat exchanging area by, for example, being corrugated and/or provided with protruding portions of some suitable kind, such as flanges. For a hybrid system using a solution sucked into a matrix it means that also the matrix is located at such a surface of the heat exchanger.

Figure 3:
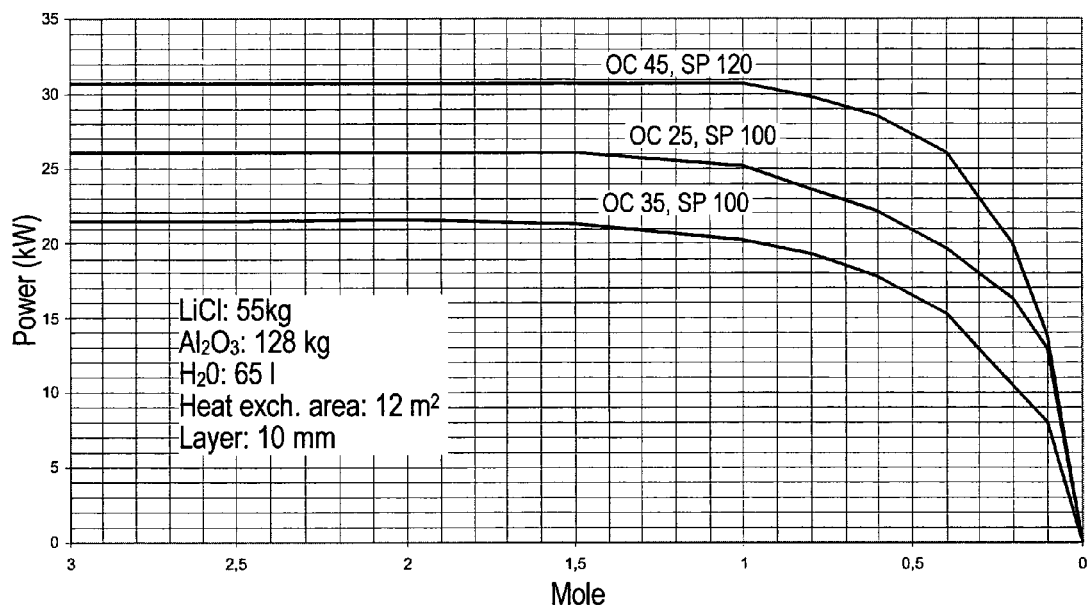
FIG. 3 is a diagram of the charging process in a chemical heat pump according to FIG. 2a using LiCl as the active substance 2.
Figure 4:
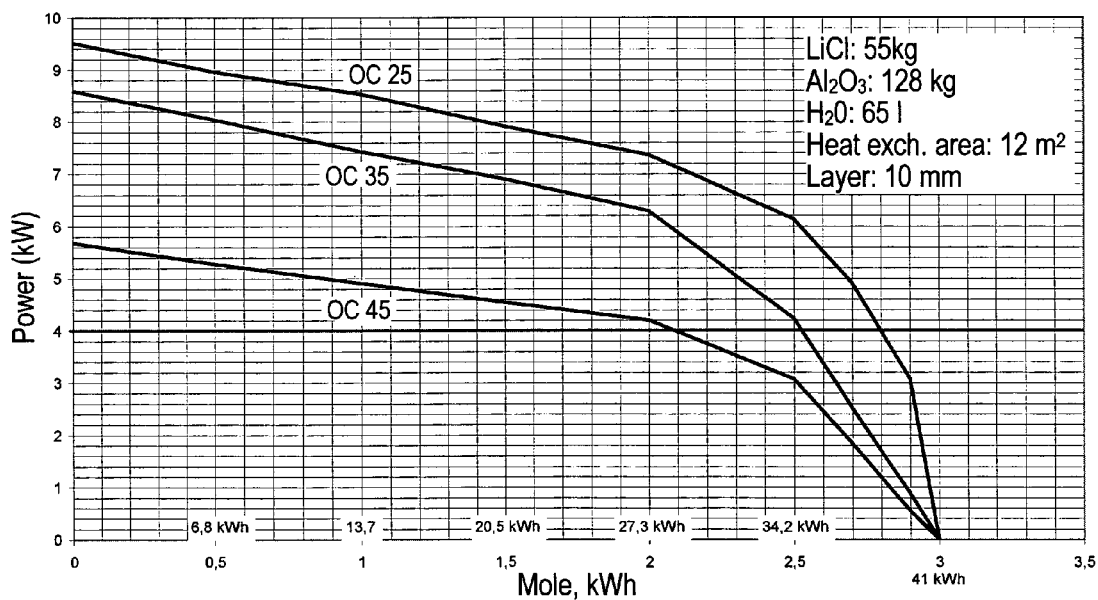
FIG. 4 is a diagram similar to FIG. 3 but of the discharging process.
Figure 5:
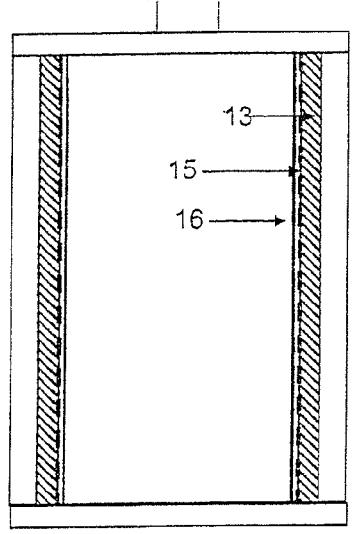
FIG. 5 is a schematic of an accumulator tank for the chemical heat pump shown in FIG. 2a, FIG. 6 is a schematic of a chemical heat pump similar to that of FIG. 2a but having a different configuration.

Tests that have been performed at a laboratory scale and then have been recalculated for a full scale have provided data for charging and discharging, respectively, which appear from the diagrams of FIGS. 3 and 4. These tests have been performed using accumulators 1 having the shape of circular cylindrical vessels of 1 liter of the diameter 100 mm and height 130 mm, in which a matrix layer 13 having a thickness of 10 mm of an inert material with an active substance 2 contained therein is located at the cylindrical interior surface of the vessel, i.e. at the interior side of its envelope surface. The matrix material and the active substance 2 are in this embodiment held at their places by a net structure including a net 15 having an exterior covering of a more fine meshed structure, such as a cotton cloth 16 or a fine meshed net, see FIG. 5. Any changes of the structure or function of the layer including an inert carrier and the active substance 2 have not been observed during the tests performed.

Figure 11A:
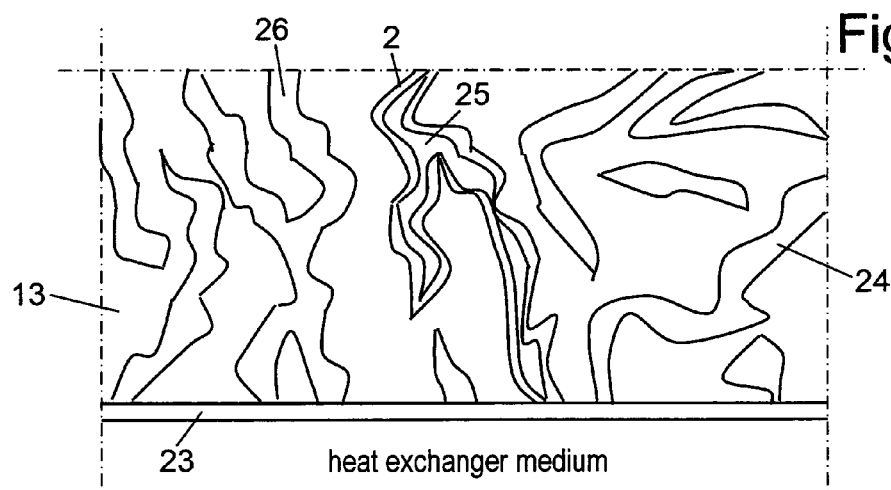
FIGS. 11a, 11b and 11c are cross-sectional detail views of a matrix material placed at a heat exchanger surface.
Figure 11B:
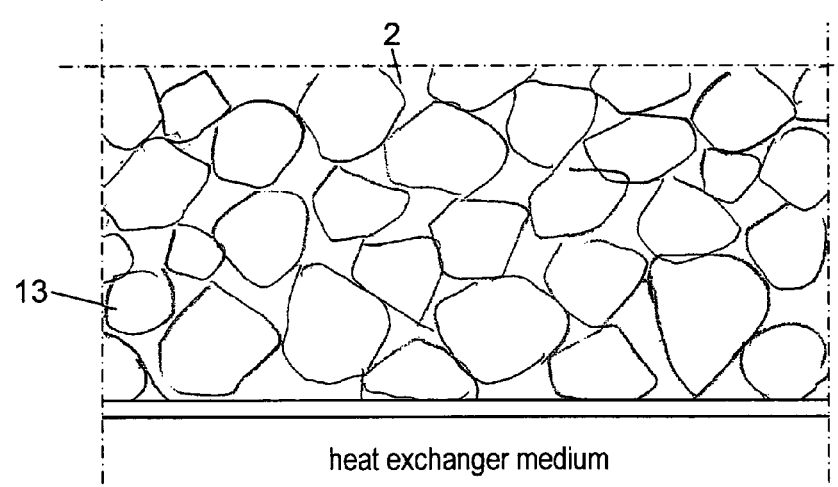
Figure 11C:
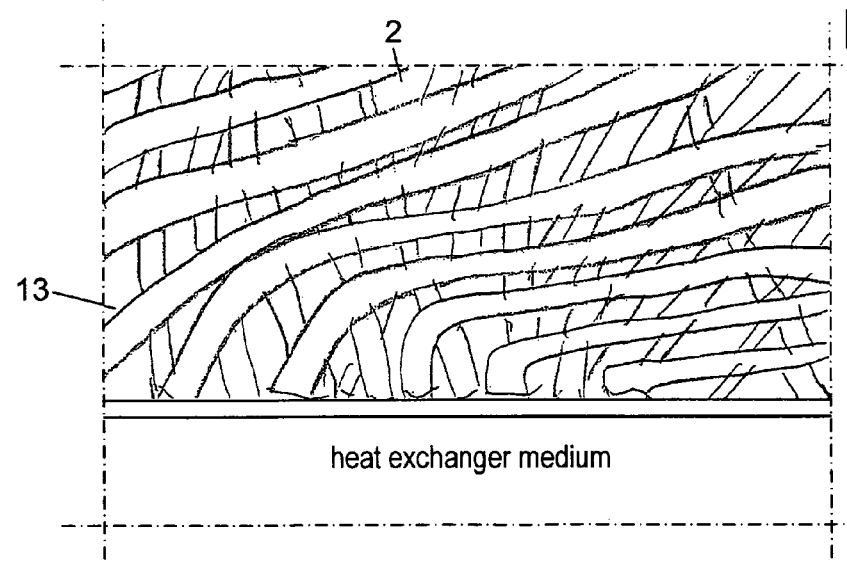

The general structure of the matrix is schematically shown in FIG. 11a. The matrix layer or the body 13 of a porous matrix material is applied to one side of a heat exchanger wall 23 and has pores 24. The pores have generally such a cross section that they allow transport and absorption of the gaseous sorbate. The matrix can carry the active substance 2 on the walls of the pores that can interact with gaseous sorbate in the remaining channels 25 that can exist in some stages of the operation of the heat pump. The pores 24 can also be completely filled (as shown at 26) with solution or with condensate, respectively. The matrix material is chosen so that it at its surface can bind the active substance/solution/condensate, and hence, it can suitably be hydrophilic or at least have a hydrophilic surface, if water is used as the fluid in the system. However, it is possible, to use materials which have no hydrophilic surface or generally no surface that is wet by the active substance 2 in the solution phase thereof or at which the active substance 2 in its solution phase is not significantly bonded, provided that the active substance 2 is introduced into the matrix 13, such as by mixing or sting it together with it before it is applied at the heat exchanger walls, even if a chemical heat pump having such a matrix often works satisfactorily only during a few cycles of the operation of the heat pump. The size of the pores 24 can be selected, for example, so that they are capillary sucking for the liquid phase that they are to absorb which can be particularly suitable for a matrix placed in the condenser/evaporator 3. Typical cross-sectional dimensions of the pores 24 can be in the range of 10-60 µm. It may be disadvantageous to have too narrow pores since they can make the interaction of the volatile medium with all parts of the active substance 2 more difficult. The volume of the pores can be for example at least 20% and preferably at least 40%, even at least 50% of the bulk volume of the matrix body. The matrix 13 can, as has been mentioned above, alternatively be of a sintered or equivalent material, i.e. form a substantially solid, connected body. The matrix 13 can also be formed from particles of different shapes, such as more or less spherical particles, see FIG. 11*b*, or from elongated particles, for example from fibre pieces that can be relatively short having a length/thickness ratio in e.g. the range of 1:2 to 1:10, see FIG. 11*c*. The heat exchanger wall 23 can be provided with flanges 27 as shown in FIG. 11*d*.

Example 1 of Matrix Material

A material suitable as a matrix material is produced from a powder of $Al_2O_3$. The density of the powder grains is 2.8 kg/cm$^3$ and their diameter is 2-4 µm. The powder is applied in layers with a solution of active substance 2 contained therein according to the description above and the dry matrix material in the layers has a bulk density of about 0.46 kg/cm.sup.3 which gives an average filling rate or degree of the finished matrix material of 0.45, i.e. almost half the volume is taken by the powder grains. The channels between the powder grains in the produced layers have a diameter of the magnitude of order of 60 µm.

Example 2 of Matrix Material

A material suitable as a matrix material is produced by moulding a mixture of 1 (weight) part of Portland cement and 5 (weight) parts of powder of $Al_2O_3$, as in Example 1. This material can approximately be considered as "sintered".

Example 3 of Matrix Material

A fibre material suitable as a matrix material is produced from fibres which consist of 54% $SiO_2$ and 47% $Al_2O_3$ and have a melting point of about 1700.degree. C. The density of the fibres is 2.56 kg/cm.sup.3 and the diameters thereof are 2-4 µm. The fibres are compressed in a wet state to increase their packing density. The bulk density after drying the compressed material is about 0.46 kg/cm$^3$ which gives an average filling ratio of 0.17 of the finished matrix material. The channels between the fibres in the compressed material have diameters of between about 5 and 10 µm.

In the embodiment described above the matrix layer 13 is applied in the simplest possible way, such as to a substantially smooth interior surface of a heat exchanger. Various shapes of heat structures and matrix layers applied thereto can be considered, compare the patent application WO 00/31206 mentioned above. Hereinafter examples on such additional different conceivable configurations of matrix and heat exchangers are given that can be suitable in installations in which the matrix technique as described above is used. In an ordinary stationary installation thus the matrix layer can for example be applied to the exterior side of one of more pipes in which a heat exchanger medium or a heat carrying medium is circulating. For example, tests have been performed for pipes having a diameter of 22 mm, around which matrix layers having a thickness of 10 mm have been applied.

Figure 6:
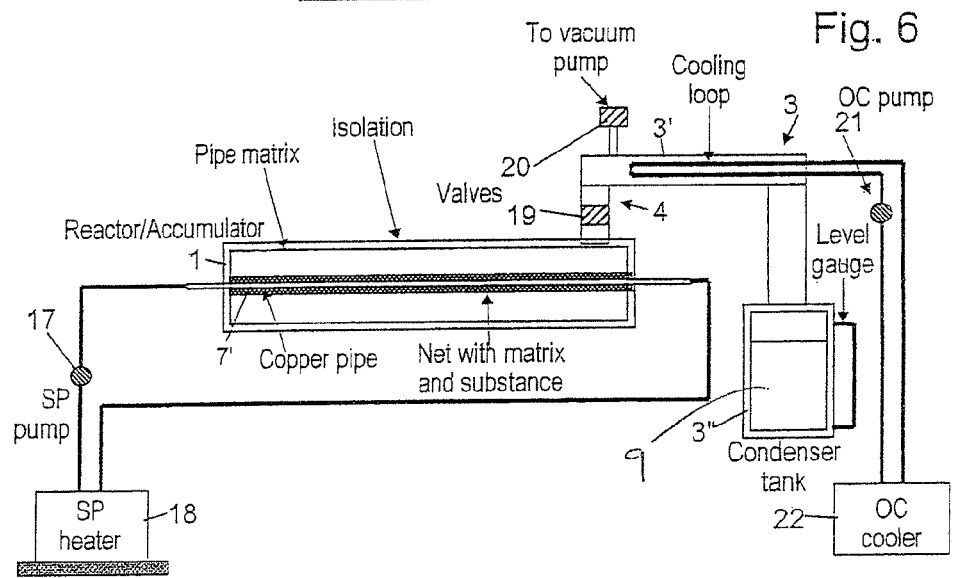

If a plurality of such heat exchanger pipes are connected in parallel and placed in a vessel, a powerful reactor 1 can be obtained. FIG. 6 shows such a heat exchanger pipe 7' mounted horizontally in an accumulator vessel 1 thermally insulated on its exterior side in a test installation. Apparently a plurality of such pipes can be connected and be arranged in parallel even if it is not shown in the figure. The pipe 7' is at least in its portion inside the vessel made from a well heat conducting material, for example from a suitable metal such as copper. It is through suitable pipe conduits containing a pump 17 coupled to a heating unit such as a solar panel 18. The matrix layer 13 is applied to the outside of the copper pipe 7' with the substance held therein. The gas pathway 4 from the reactor 1 contains a valve 19, is connected to a vacuum source through a valve 20 and is connected to a top portion 3' of the evaporator/condenser 3, the bottom portion of which is a condenser tank 3" for receiving the condensed absorbent. The heat exchanger 9 for the evaporator/condenser is here shown as a simple cooling loop arranged in the upper portion of the evaporator/condenser and is through suitable pipe conduits containing a pump 21 coupled to a cooling medium cooler 22.

In an accumulator tank, such pipes 7' can be placed in a lying fashion as in FIG. 6, or in a standing fashion, i.e. vertically. If they are placed standing in a tank they can have the structure illustrated in FIG. 7.

It is also possible to build floors of low plates 25 having the heat carriers 26 arranged at the bottoms thereof and placed above each other in a tank, as can be seen in FIG. 8. Channels connect the spaces above and between the plates to the top portion of the tank where suitably the connection, not shown, to the gas channel is located. Hence, spaces 27 at the vertical interior side surfaces can form such channels. Such a channel can also be vertically arranged and pass through the plates 25. For example, it can be centrally located such as is shown in the figure. The plates 25 must then have corresponding through-holes, for example centrally arranged holes.

In another embodiment unit pipes 29 are provided in which the reactor 1 and the condenser 3 are located inside the same closed pipe 29. The reactor part 1 then has its matrix layer 13 and active substance 2 located around the bottom portion of the interior surface of the walls, as can be seen in FIG. 9*a*. The top portion of the pipe 29 that forms the condenser/evaporator part 3 is separated by a diaphragm 30 from which the gas channel 31 in an interior pipe 32 passes to the top portion 33 of the pipe 29, from which vapour then can be condensed and collected in the spaces 34 between the gas channel 31 and the upper wall surfaces in the unit pipe 29, and evaporate from this space. Such unit pipes can be manufactured totally hermetically from glass or enameled steel.

Figure 10B:
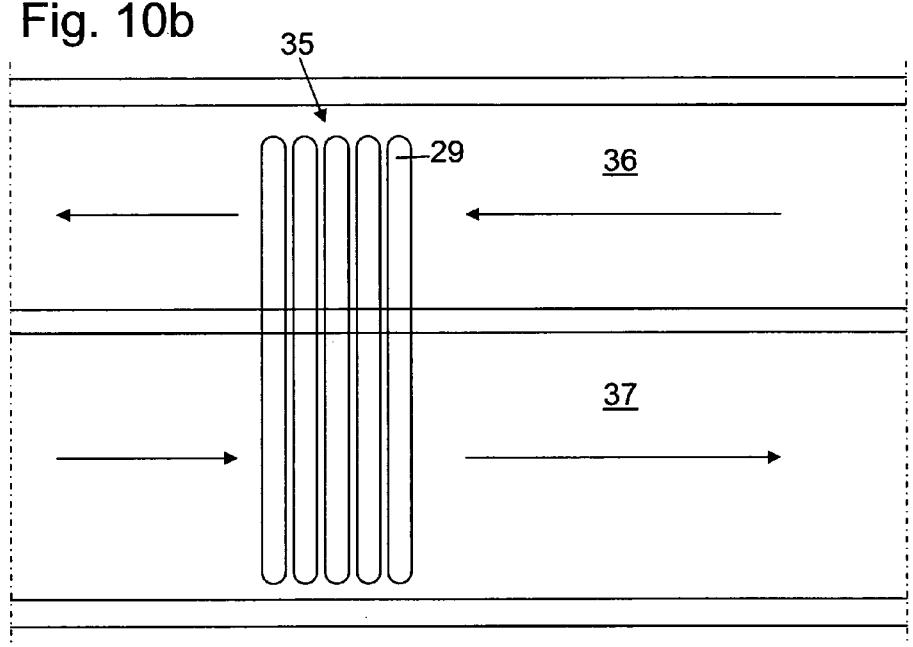
FIG. 10b is a schematic illustrating the location of the unit pipes of FIG. 9a or 9b for exchange of heat in air flows.

The bottom part of a unit pipe 29, the reactor, can then be placed in a heat carrying medium that is circulating to and from a solar panel and a cooler placed outdoors, respectively, or be placed in the latter one, whereas the top portion of the pipe 29 is placed in a heat carrying medium that is flowing to radiators in an air conditioning (AC) system for cooling, for example a private home, an apartment or an office or a cooler placed outdoors, respectively, or in the latter one, as shown in FIGS. 10*a* and 10*b*. As is seen in FIG. 10*b*, a battery 35 of unit pipes 29 is placed with the top portions of the pipes located in an upper air channel 36 and their bottom portions in a lower air channel 37. In the charging process, outdoor air passes in the upper air channel 36, and then cools the top portions of the unit pipes 29, the condenser/evaporator parts 3, to condense water vapour therein. In the lower air channel 37, heated air from, for example, the solar panel, not shown, flows and heats the bottom portions of the unit pipes 29 for releasing water vapour. In the discharging process outdoor air passing in the lower air channel 37, cooling the lower portions, the reactor parts 1, of the unit pipes 29. Air passing in the upper air channel 36 is cooled by contact with the top portions of the unit pipes for transport to, for example, a room of a private home or apartment for air conditioning The unit pipe 29 can also have, a matrix substance 14 placed in its condenser/evaporator part 3, and it can then be placed at the top portion of the interior surface of the pipe, inside the space 34, so that a channel 38 is formed between the exterior surface of the pipe 32 and the interior surface of the matrix 14 for allowing condensate and vapour to pass to all portions of the matrix 14, as shown in FIG. 9b.

Figure 12A:
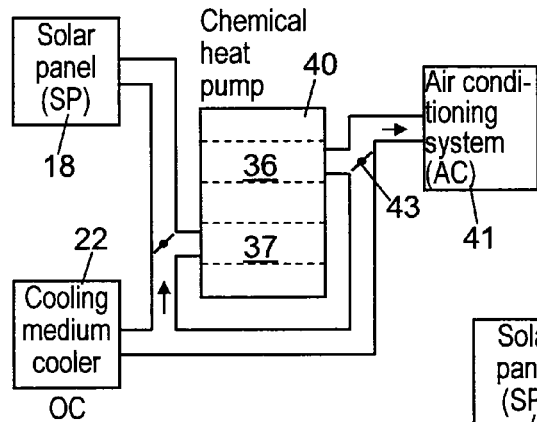
FIGS. 12a and 12b are schematics illustrating a chemical heat pump having exchange of heat with air and with a liquid medium, respectively.

In the heat pump installation that is shown in FIG. 12a and is based on heat conducted by air, the chemical heat pump 40 is through pipe conduits connected to a heat source such as a solar panel 18, to a cooling medium cooler 22 such as an intake of outdoor air and to an air conditioning system 41. Butterfly valves 42, 43 are set in different positions in order to conduct an in a suitable way, both to the upper channel 36 and the lower air channel it the heat pump for cooling/heating the reactor and condenser/evaporator parts, respectively, in contrast to the embodiment in FIG. 10b. Instead air as the medium, a heat carrying liquid medium can be used, such as in the installation shown in FIG. 12b. Double pipe conduits here connect solar panel 18, cooling medium cooler 22, and air conditioning system 41 to the heat pump 40. Double three way valves 44, 45 control the flow of the heat carrying medium in a suitable way.

Figure 12B:
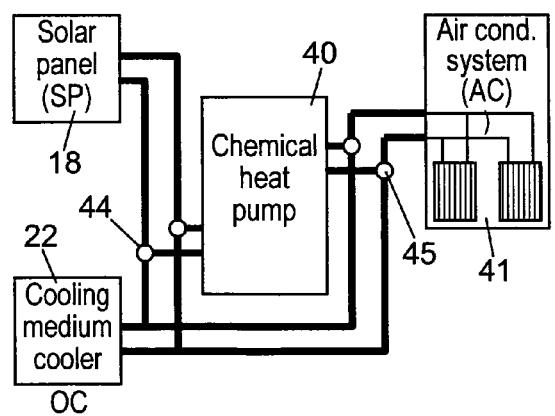

It is also possible that all fluid, i.e. typically all the water, in the condenser can be sucked in a capillary way and thereby be completely eliminated as a free liquid in the chemical heat pump, as shown in the installation in FIG. 12b. Here, all the interior surfaces of the evaporator/condenser 3, except the top interior surface, have been provided with a matrix material that is capillary sucking. The heat exchanging medium must then also be circulating at the bottom of this container.

Another possibility is to integrate the unit pipes mentioned above, in that case manufactured from glass, with the solar panel, that thus also becomes the storage and process unit for chillness/cooling and heat. It is also possible to use these unit cells in air channels, where they are charged and discharged and generate chillness/cooling or heat.

While specific embodiments of the invention have been illustrated and described herein, it is realized that numerous other embodiments may be envisaged and that numerous additional advantages, modifications and changes will readily occur to those skilled in the ah without departing from the spirit and scope of the invention. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention. Numerous other embodiments may be envisaged without departing from the spirit and scope of the invention.

The invention claimed is:

1. A chemical heat pump including an active substance and a volatile liquid that can be absorbed by the active substance at a first temperature and desorbed by the active substance at a second higher temperature, the active substance having at the first temperature a solid state that absorbs the volatile liquid and a vapour phase thereof, the active substance changing to a liquid state or a solution phase as it absorbs the volatile liquid, and at the second temperature the active substance has a liquid state or exists in a solution phase, from which the volatile liquid and a vapour phase are desorbed as the active substance changes back at least partly to the solid state, including:
   a reactor part containing the active substance and including a first heat exchanger,
   an evaporator/condenser part containing a portion of the volatile liquid that exists in a condensed state, and including a second heat exchanger, and
   a channel for the vapour phase of the volatile liquid that connects the reactor part and the evaporator/condenser part to each other,
   wherein the reactor part contains a matrix for the active substance, so that the active substance is held in the matrix at all times whether the active substance is in a solid state, a liquid state, or a solution phase, wherein the matrix comprises open pores, and cross-sectional dimensions of the pores are in a range of 10-60 um.

2. The chemical heat pump according to claim 1, wherein the matrix is of an inert material.

3. The chemical heat pump according to claim 1, wherein the matrix is made from a material comprising pores which are permeable to the volatile liquid and in which the active substance is applied.

4. The chemical heat pump according to claim 1, wherein the matrix is made from a material having a surface at which the active substance in the liquid state can be bonded.

5. The chemical heat pump according to claim 1, wherein the matrix is made from a material comprising separate particles.

6. The chemical heat pump according to claim 1, wherein the matrix has a shape of a layer of material applied to a surface of the first heat exchanger.

7. The chemical heat pump according to claim 1, wherein the matrix together with the active substance held therein is enclosed in a restricting structure.

8. The chemical heat pump according to claim 1, wherein at least one portion of a surface of the second heat exchanger of the evaporator/condenser part includes a porous material that is permeable to the volatile liquid.

9. The chemical heat pump according to claim 1, wherein the first or the second heat exchanger includes a separating wall between the circulating heat conducting medium and the active substance, at which the active substance is changeable from a solid state to a liquid state, and from the liquid state to the gas state,
   wherein a porous material that is permeable to the active substance in both the liquid and the gas state is provided on at least a portion of the surface of the separating wall that faces the active substance.

10. The chemical heat pump according to claim 8, wherein the porous material that is permeable to the volatile liquid or the active substance in the liquid state and the gas state thereof, respectively, is made from an inert material which includes at least aluminium oxide.

11. The chemical heat pump according to claim 8, wherein the porous material is made from a material comprising pores which are permeable to the volatile liquid.

12. The chemical heat pump according to claim 8, wherein the porous material that is permeable to the volatile liquid is made from a material having a surface at which the volatile liquid and an active substance in its liquid state, respectively, are capable of being bonded, the material having a surface that is wet by the volatile liquid or the active substance in the liquid state thereof, respectively.

13. The chemical heat pump according to claim 8, wherein the porous material that is permeable to the volatile liquid is made from a material comprising separate particles of a powder or a compressed fibre material.

14. The chemical heat pump according to claim 8, wherein the porous material that is permeable to the volatile liquid has the shape of a layer of material applied to a surface of the second heat exchanger or the separating wall, respectively.

15. The chemical heat pump according to claim 8, wherein the porous material that is permeable to the volatile liquid is enclosed in a net device including at least a net and a cloth of a fibre material.

16. The chemical heat pump according to claim 1, wherein the matrix comprises aluminium oxide.

17. The chemical heat pump according to claim 1, wherein the matrix is made from a material having a surface that is wet by the active substance in the liquid state thereof and/or by the volatile liquid in the liquid state thereof.

18. The chemical heat pump according to claim 1, wherein the matrix is made from a material made from a powder or a compressed fibre material.

19. The chemical heat pump according to claim 1, wherein the matrix together with the active substance held therein is enclosed in a net device comprising at least a net or a cloth of a fibre material.

20. The chemical heat pump according to claim 1, wherein a volume of the pores is at least 40% of a bulk volume of a body of the matrix.

21. The chemical heat pump according to claim 1, wherein a volume of the pores is at least 50% of a bulk volume of a body of the matrix.

22. The chemical heat pump according to claim 1, wherein the matrix is formed from elongated fibre pieces having a length/thickness ratio in a range of 1:2 to 1:10.

* * * * *